United States Patent [19]
Otokawa et al.

[11] Patent Number: 5,091,897
[45] Date of Patent: Feb. 25, 1992

[54] MAGNETO-OPTICAL RECORDING APPARATUS HAVING MEANS FOR DELAYING AN INPUT SIGNAL FOR PREVENTING BIT SHIFT

[75] Inventors: Mitsuhiro Otokawa; Shunpei Kimura; Yasuyuki Miyaoka, all of Yokohama, Japan

[73] Assignee: Canon Kabushiki Kaisha, Tokyo, Japan

[21] Appl. No.: 670,530

[22] Filed: Mar. 18, 1991

Related U.S. Application Data

[63] Continuation of Ser. No. 490,430, Mar. 8, 1990, abandoned.

[30] Foreign Application Priority Data

| Mar. 9, 1989 | [JP] | Japan | 1-055206 |
| Mar. 9, 1989 | [JP] | Japan | 1-055207 |
| Mar. 10, 1989 | [JP] | Japan | 1-056246 |
| Jul. 11, 1989 | [JP] | Japan | 1-177147 |

[51] Int. Cl.⁵ .................... G11B 13/04; G11B 11/12
[52] U.S. Cl. .................................... 369/13; 360/59; 360/114; 369/14
[58] Field of Search ................ 369/13, 14; 360/59, 360/66, 114, 57, 60; 365/122

[56] References Cited

U.S. PATENT DOCUMENTS

| 4,466,025 | 8/1984 | Soejima | 360/57 |
| 4,633,337 | 12/1986 | Horie et al. | 360/57 |
| 4,712,203 | 12/1987 | Saito et al. | 369/13 |
| 4,872,078 | 10/1989 | Gerber et al. | 360/59 |
| 4,907,211 | 3/1990 | Horimai | 360/114 |

FOREIGN PATENT DOCUMENTS

| 0275323 | 7/1988 | European Pat. Off. . |
| 0292733 | 11/1988 | European Pat. Off. . |
| 0304992 | 3/1989 | European Pat. Off. . |
| 62-66449 | 3/1987 | Japan | 360/114 |

Primary Examiner—Stuart S. Levy
Assistant Examiner—Hoa Nguyen
Attorney, Agent, or Firm—Fitzpatrick, Cella, Harper & Scinto

[57] ABSTRACT

An apparatus for recording an input signal on a magneto-optical recording medium. The apparatus includes an optical head for applying a light beam to the medium, a circuit for delaying the input signal by a time for preventing a bit recorded on the medium from shifting relative to the input signal, a magnetic head for applying a magnetic field modulated in conformity with the delayed signal to that portion of the medium to which the light beam is applied, and a motor for moving the medium relative to the light beam.

40 Claims, 10 Drawing Sheets

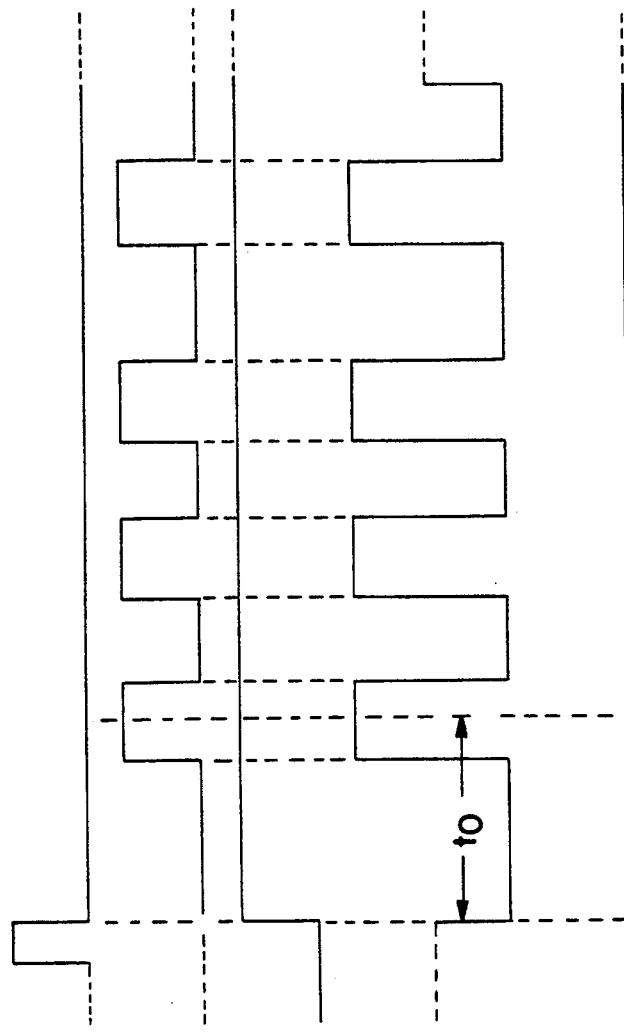
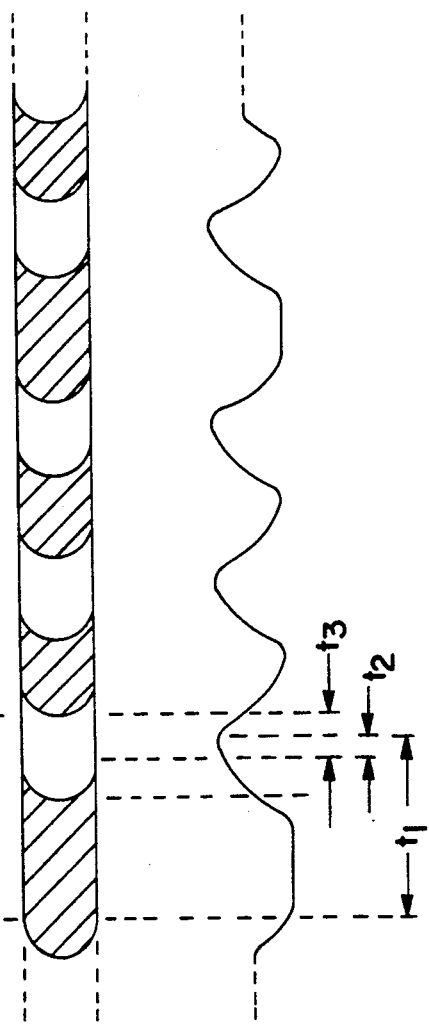
FIG.2A PRIOR ART  SYNCHRONIZING SIGNAL
FIG.2B PRIOR ART  RECORDING SIGNAL
FIG.2C PRIOR ART  LASER LIGHT INTENSITY
FIG.2D PRIOR ART  BIAS MAGNETIC FIELD INTENSITY
FIG.2E PRIOR ART  RECORDING PATTERN
FIG.2F PRIOR ART  REPRODUCTION SIGNAL

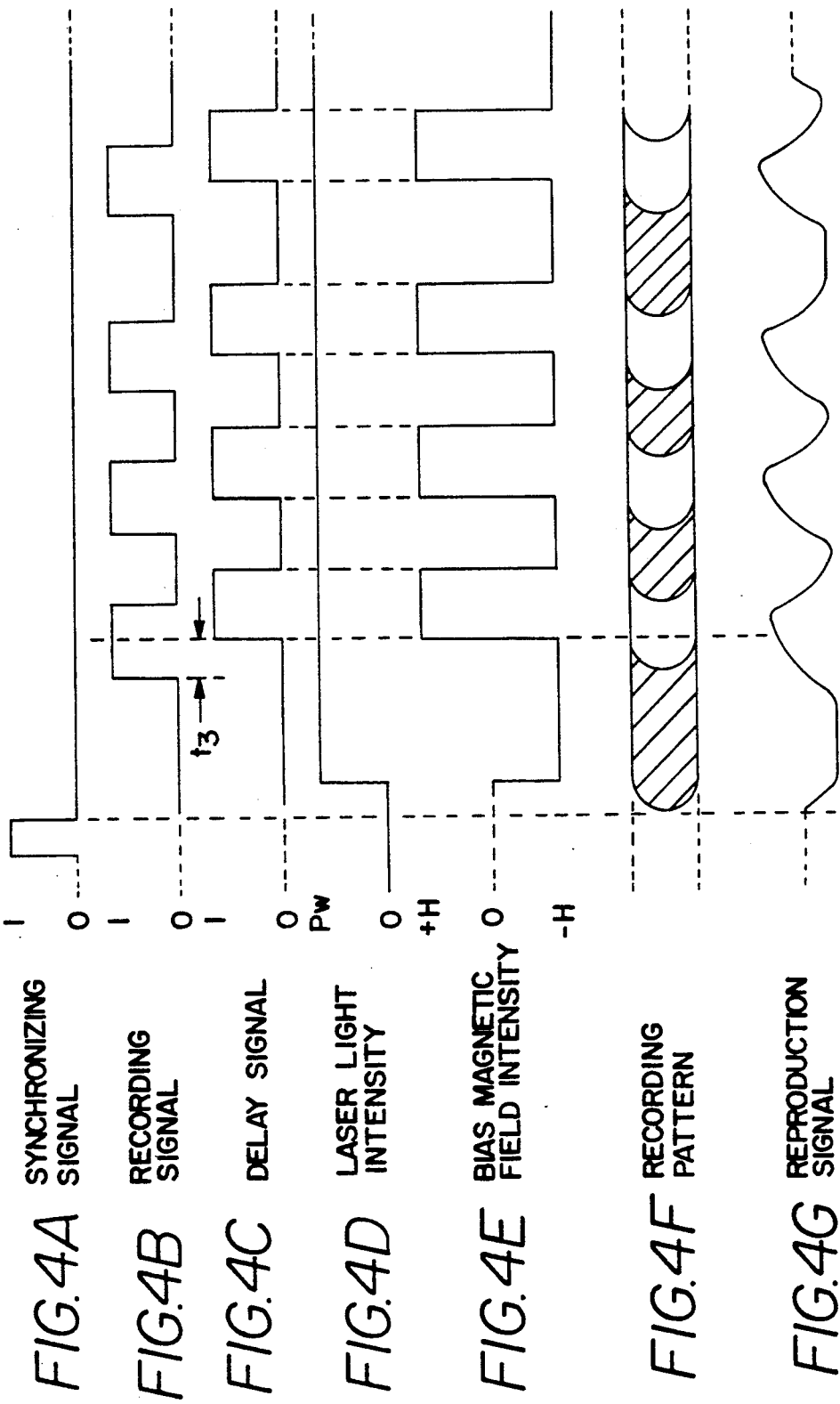

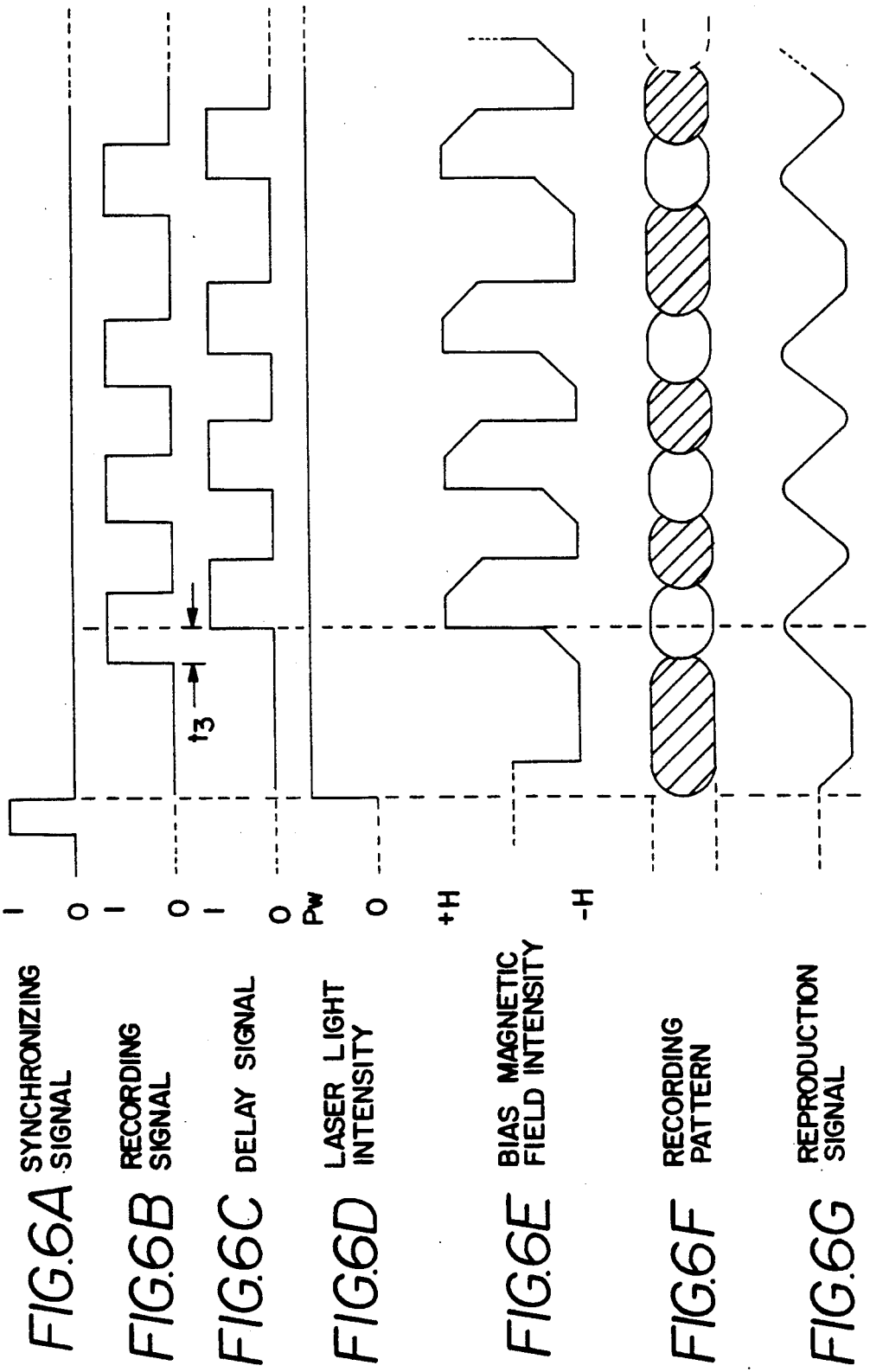

FIG.7A DATA
FIG.7B MAGNETIC FIELD
FIG.7C LASER SPOT
FIG.7D ISOTHERMAL LINE
FIG.7E RECORDING PATTERN
FIG.7F REPRODUCTION SIGNAL
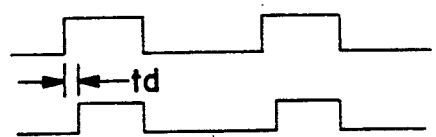
FIG.8A DATA
FIG.8B MAGNETIC FIELD
FIG.8C LASER POWER — PomW
FIG.8D LASER SPOT
FIG.8E ISOTHERMAL LINE
FIG.8F RECORDING PATTERN
FIG.8G REPRODUCTION SIGNAL
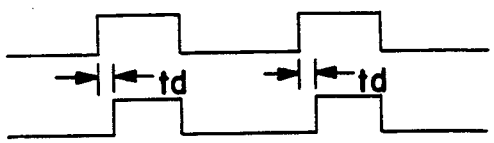
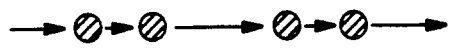
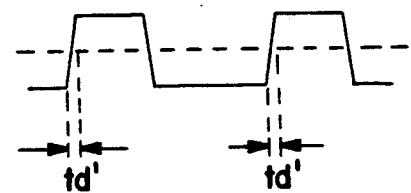

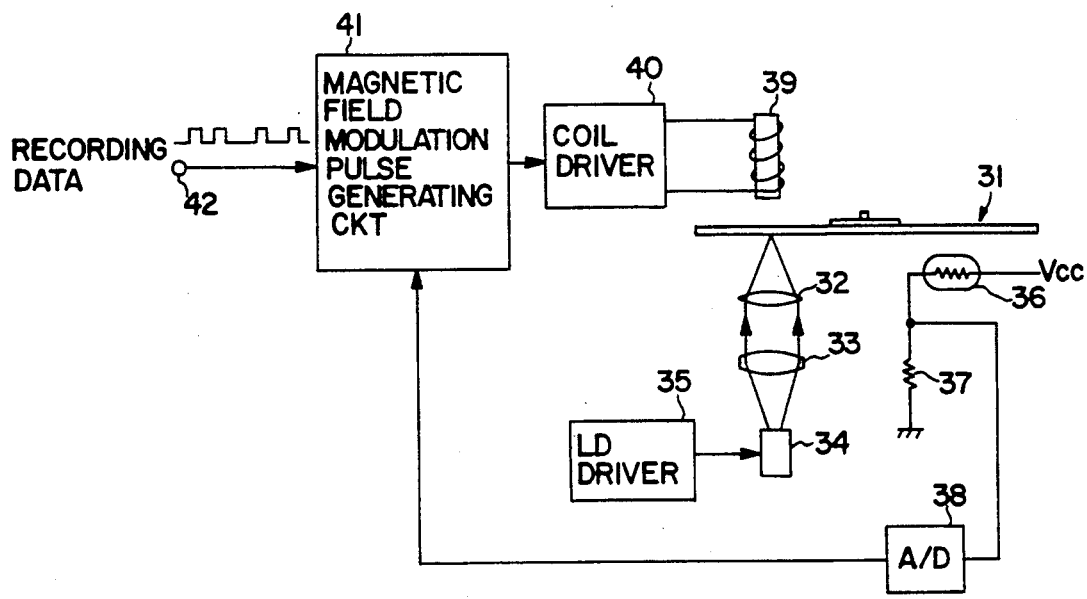
FIG. 9
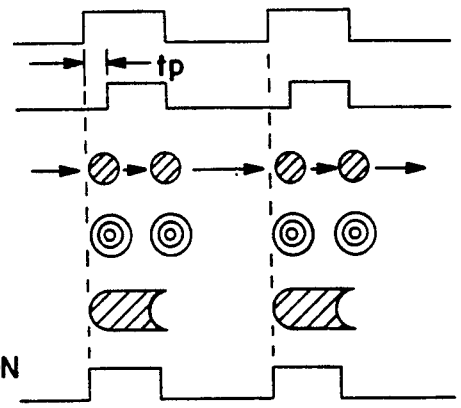
FIG.10A DATA
FIG.10B MAGNETIC FIELD
FIG.10C LASER SPOT
FIG.10D ISOTHERMAL LINE
FIG.10E RECORDING PATTERN
FIG.10F REPRODUCTION SIGNAL

MAGNETO-OPTICAL RECORDING APPARATUS HAVING MEANS FOR DELAYING AN INPUT SIGNAL FOR PREVENTING BIT SHIFT

This application is a continuation of prior application Ser. No. 07/490,430, filed Mar. 8, 1990, now abandoned.

BACKGROUND OF THE INVENTION

1. Field of the Invention

This invention relates to a magneto-optical recording apparatus for recording signals by applying a magnetic field modulated in conformity with a recording signal to a magneto-optical recording medium while applying a laser beam to the magneto-optical recording medium.

2. Related Background Art

In recent years, studies of an optical information recording apparatus as a memory of large capacity have been actively done. Particularly, magneto-optical recording has been drawing attention, because of its capability of rewriting information. As a method of magneto-optical recording, there is known a method of applying a magnetic field modulated in conformity with a recording signal to a magneto-optical recording medium while applying a light beam to the magneto-optical recording medium. This method is called a magnetic field modulation method, and includes a feature that signals to be renewed can be overwritten without erasing previously recorded signals in advance.

An example of a magneto-optical recording apparatus using the above-described method is schematically shown in FIG. 1 of the accompanying drawings. In FIG. 1, the reference numeral 1 designates a magnetooptical disk which is formed by attaching vertically magnetized film 3 to a glass substrate 2. This magnetooptical disk 1 is rotated about the center axis 0—0'.

The reference numeral 4 denotes an optical head for applying laser light to the vertically magnetized film 3 of the magneto-optical disk 1. This optical head 4 is comprised chiefly of a semiconductor laser 5 and a condensing lens 6. The optical head 4 is designed to act on the vertically magnetized film 3 so that the laser light may be focused thereon, and to be movable radially with respect to the magneto-optical disk 1. The reference numeral 7 designates an electromagnet disposed so as to be opposed to the optical head 4 relative to the magneto-optical disk 1 for applying a bias magnetic field to the vertically magnetized film 3. This electromagnet 7 is designed to move radially of the magneto-optical disk in operative association with the optical head 4. An electric current inverted in phase in conformity with a recording signal is supplied from a magnetic field modulation circuit 9 to the coil 8 of the electromagnet 7.

The magnetic field modulation circuit 9 is operated by a recording signal input from a terminal 10. For example, when the recording signal changes as shown in (b$_1$) of FIG. 2A of the accompanying drawings, the electromagnet 7 produces a magnetic field shown in FIG. 2D in synchronism therewith. Here, when the recording signal is "1", a magnetic field of a predetermined intensity +H is produced in a direction with the direction of magnetization of the vertically magnetized film 3 as the upward direction. On the other hand, when the recording signal is "0", a magnetic field of a predetermined intensity −H is produced just in the opposite direction to that when the recording signal is "1". At this time, the optical head 4 continuously emits a laser light of a predetermined intensity as shown in FIG. 2C when the recording condition is brought about, and the laser light locally illuminates the vertically magnetized film of the magneto-optical disk 1. Thus, the temperature of the vertically magnetized film in this irradiated portion rises to the curie point or higher.

By the process as described above, a recording pattern as shown as a model in FIG. 2E is formed on the vertically magnetized film. In this case, the blank portions and the recording patterns indicated by hatching show the upwardly magnetized state and the downwardly magnetized state, respectively.

In the above-described method, however, the spot of the light beam has a finite size, and this has led to a problem that the end portion of each bit of the recording pattern suffers from positional deviation relative to the recording signal, i.e., so-called bit shift, as shown in FIG. 2. On the other hand, the shape of the recording bit becomes a chevron-like shape as shown in FIG. 2E and therefore, there has been created a time difference $t_2$ between the center of the recording signal and the peak of a signal (shown in FIG. 2F) reproduced from this recording pattern. This phenomenon will hereinafter be referred to as the peak shift. Due to this phenomenon, for example, the time $t_1$ to the peak of the reproduction signal (FIG. 2F) becomes shorter by $(t_3-t_2)$ relative to the time $t_0$ from a synchronizing signal reproduced from a prepit formed unevenly on the magneto-optical disk 1 to the center of "1" of the recording signal. Here, $t_3$ is the time difference by bit shift, and $t_2$ is the time difference by peak shift.

SUMMARY OF THE INVENTION

It is the object of the present invention to solve the above-noted problems peculiar to the prior art and to provide a magneto-optical recording apparatus in which bit shift can be prevented.

The above object of the present invention is achieved by an apparatus for recording an input signal on a magneto-optical recording medium, comprising means for applying a light beam to the medium, means for delaying said input signal by a time for preventing a bit recorded on the medium from shifting relative to said input signal, means for applying a magnetic field modulated in conformity with said delayed signal to that portion of the medium to which the light beam is applied, and means for moving the medium relative to said light beam.

In addition to said delaying means, provision may be made of means for making the intensity of the magnetic field applied to the medium smaller in the rear portion of each pulse of a recording signal than in the other portion, whereby a recording bit can be prevented from assuming a chevron-like shape, thereby eliminating peak shift.

BRIEF DESCRIPTION OF THE DRAWINGS

FIG. 2A–2F are a timing chart showing the states of the signals of various portions in the apparatus shown in FIG. 1.

FIGS. 4A-4G are a timing chart showing the states of the signals of various portions in the apparatus shown in FIG. 3.

FIGS. 6A-6G are a timing chart showing the states of the signals of various portions in the apparatus shown in FIG. 5.

FIGS. 7A-7F and 8A-8G are timing charts for illustrating variations in a recording pattern when the temperature of a medium charges.

FIG. 9 is a schematic diagram showing a third embodiment of the magneto-optical recording apparatus of the present invention.

FIGS. 10A-10F are a timing chart showing the states of the signals of various portions in the apparatus shown in FIG. 9.

DESCRIPTION OF THE PREFERRED EMBODIMENTS

Figure 1:
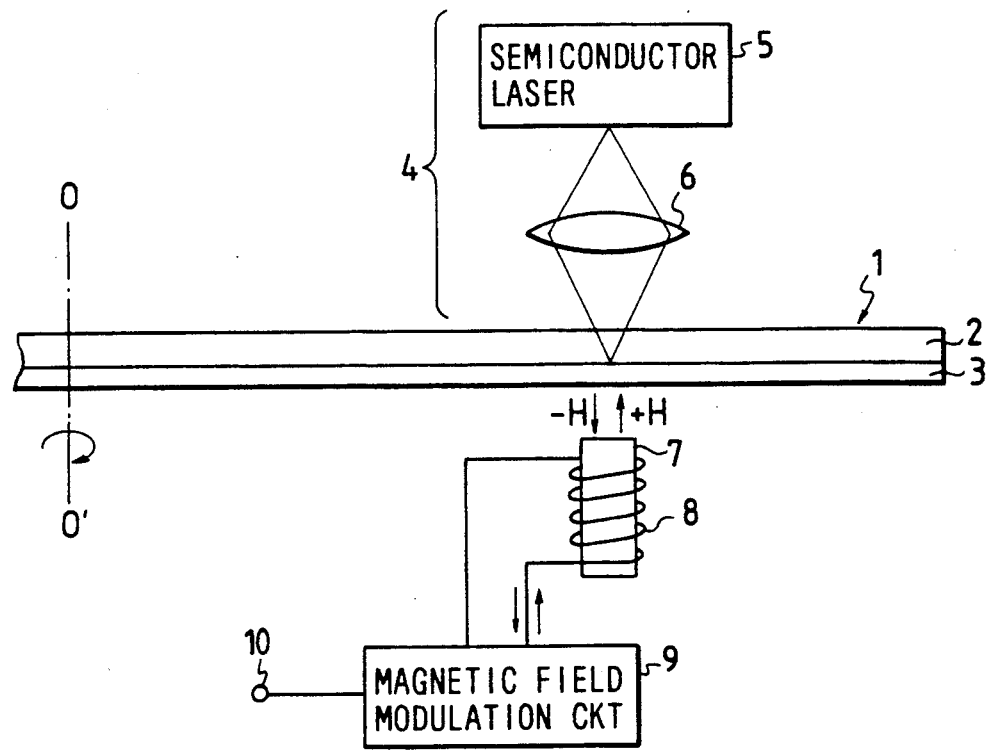
FIG. 1 is a schematic view showing an example of the magneto-optical recording apparatus according to the prior art.
Figure 3:
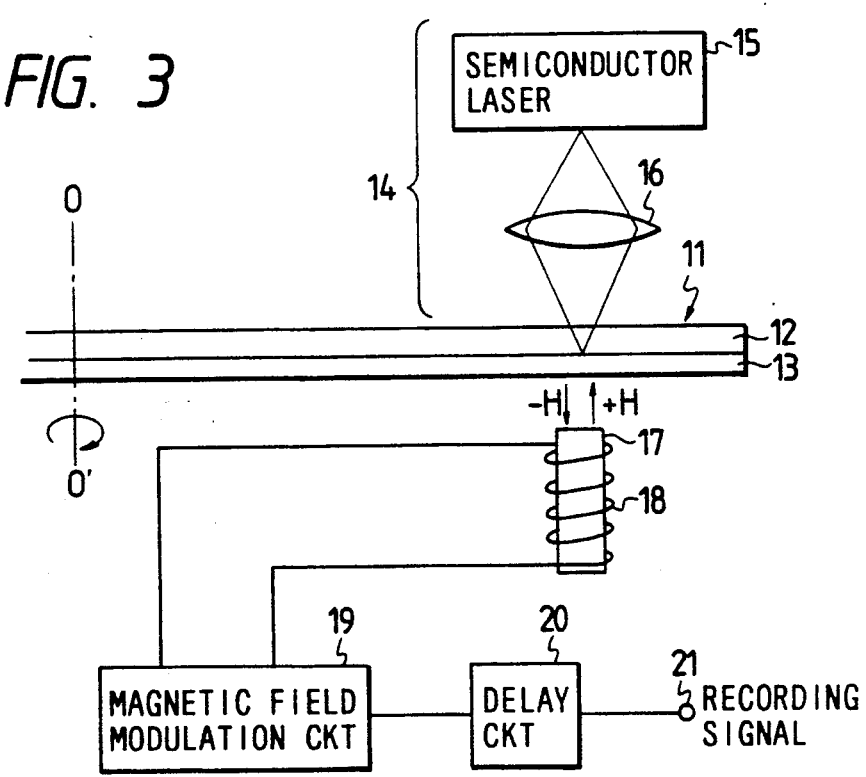
FIG. 3 is a schematic view showing a first embodiment of the magneto-optical recording apparatus of the present invention.

FIG. 3 is a schematic view showing the construction of a first embodiment of the magneto-optical recording apparatus according to the present invention.

In FIG. 3, the reference numeral 11 designates a magneto-optical disk which is formed by attaching vertically magnetized film 13 to a glass substrate 12. A plurality of tracks are formed concentrically or spirally on the disk 11. This magneto-optical disk 11 is rotated about the center axis 0-0' by a spindle motor, not shown. The reference numeral 14 denotes an optical head basically comprised of a semiconductor laser 15 and a lens 16. A laser light emitted from the semiconductor laser 15 is condensed by the lens 16 so as to be always focused on the vertically magnetized film 13. The optical head 14 is also movable radially of the magneto-optical disk 11. The reference numeral 17 designates a bias magnetic field producing head disposed in opposed relationship with the position at which the laser light is condensed by the optical head 14. The bias magnetic field producing head 17 comprises an electromagnet including a coil 18. The bias magnetic field producing head 17 is driven by a magnetic field modulation circuit 19. The reference numeral 20 denotes a delay circuit for delaying an information signal input from a terminal 21. The magnetic field modulation circuit 19 is driven in synchronism with the information signal delayed by the delay circuit 20. The amount of delay by the delay circuit 20 is a time corresponding to $t_3$ shown in FIG. 2 which shows the prior art. The bias magnetic field producing head 17 is designed to move radially with respect to the optical disk 11, following the optical head 14.

Consider a case where, in the above-described constructions, as shown in FIG. 4, a synchronizing signal (FIG. 4A) indicative of the beginning of an information recording area has been obtained from a prepit prerecorded on the magneto-optical disk 11. A recording signal (FIG. 4B) is input with the synchronizing signal as a reference. This recording signal (FIG. 4B) is input from the terminal 21 to the delay circuit 20, where it is delayed by the time $t_3$ and becomes a delay signal (FIG. 4C). Also, simultaneously with the synchronizing signal, a laser light is emitted from, the optical head 14, and as indicated in FIG. 4D, continues to be continuously applied onto the magneto-optical disk 11 with such a laser power Pw that will render the temperature of the vertically magnetized film 13 higher than the curie point.

On the other hand, the magnetic field modulation circuit 19, in response to the delay signal (FIG. 4C), applies a magnetic field modulated with intensities of ±H shown in FIG. 4E from the bias magnetic field producing head 17 to the disk. In this manner, a pattern schematically shown in FIG. 4F is recorded on the vertically magnetized film 13. In FIG. 4F, the blank portions and the hatching portions respectively represent that the vertically magnetized film is magnetized upwardly and downwardly. A signal reproduced from this recording pattern is such as shown in FIG. 4G. Thus, the reproduction signal assumes a waveform which is not affected by the bit shift as shown in the example of the prior art.

Figure 5:
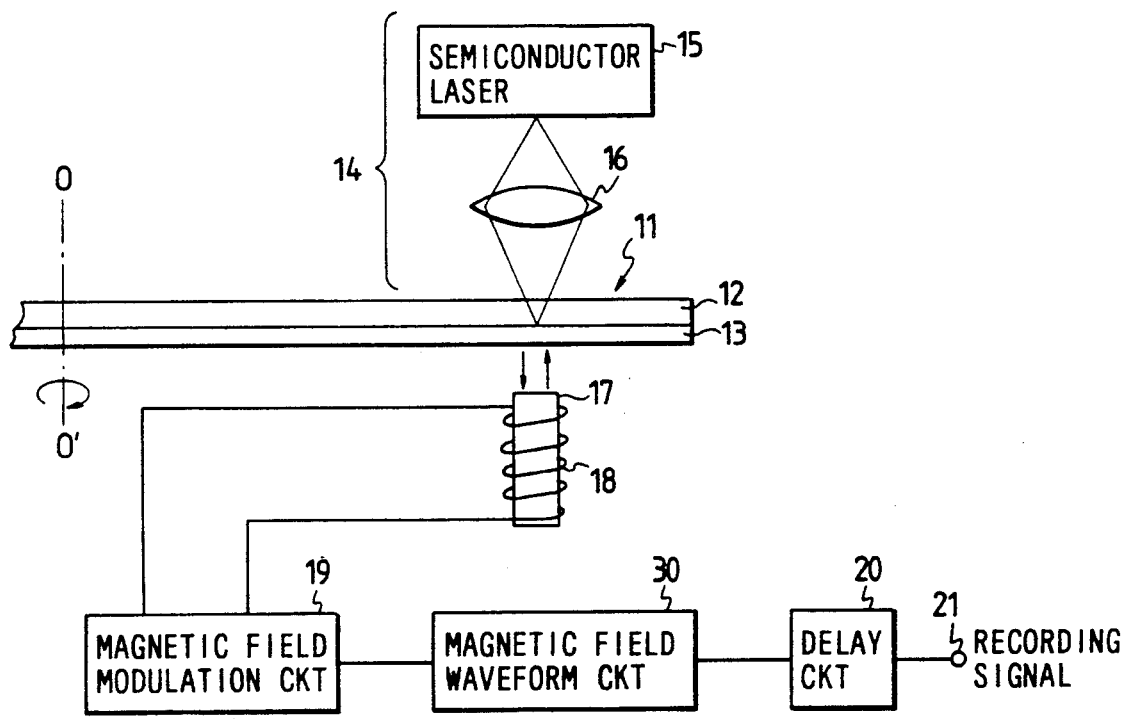
FIG. 5 is a schematic view showing a second embodiment of the magneto-optical recording apparatus of the present invention.

FIG. 5 is a schematic view showing a second embodiment of the magneto-optical recording apparatus of the present invention. In FIG. 5, members identical to those in FIG. 3 are given identical reference numerals and need not be described in detail. The present embodiment differs from the aforedescribed embodiment in that a magnetic field waveform adjusting circuit 30 is provided between the delay circuit 20 and the magnetic field modulation circuit 19. In the present embodiment, this circuit 30 makes the magnetic field intensity in the rear end portion of the recording pulse smaller than that in the other portion. Thereby, the recording pattern is prevented from assuming a chevron-like shape, and in addition to the aforementioned bit shift, peak shift is eliminated.

The recording process in the present embodiment will hereinafter be described with reference to FIG. 6.

When, as shown in FIG. 6, a synchronizing signal (FIG. 6A) is detected, from the magneto-optical disk 11, a recording signal (FIG. 6B) is input with this synchronizing signal as a reference. This recording signal is delayed by $t_3$ indicated in FIG. 2 by the delay circuit 20, and becomes a delay signal (FIG. 6C).

On the basis of the delay signal, the magnetic field waveform adjusting circuit 30 produces a bias magnetic field of the intensity shown in FIG. 6E from the bias magnetic field producing head 17 through the magnetic field modulation circuit 19. This magnetic field is controlled so that its intensity may become smaller during the time corresponding to the rear portion of the bit in the pulse forming each bit than during the time corresponding to the other portion.

On the other hand, a laser light of the intensity shown in FIG. 6D is continuously applied from the optical head 14 to the disk 11. Since the intensity of the laser light is thus constant, the width of a recorded bit depends on the intensity of the magnetic field applied. When the intensity of the magnetic field becomes weak in the rear end portion of the pulse, a bit is formed only in the higher temperature area of the temperature distribution on the vertically magnetized film 3. Accordingly, the pattern of the recorded bit becomes such as schematically shown in FIG. 6F and does not assume a chevron-like shape. Here, the blank portions and the hatching portions respectively represent that the vertically magnetized film is magnetized upwardly and downwardly. Thus, a signal reproduced from such a recording pattern is free from bit shift and peak shift, as shown in FIG. 6G.

In the above-described embodiments, the temperature of the medium has been constant, but it is conceivable that if this temperature changes, it will affect the amount of bit shift. This will now be described with reference to FIGS. 7 and 8.

When data (FIG. 7A) is input when the magneto-optical disk is at a certain temperature, the changeover timing of the magnetic field (FIG. 7B) is delayed with respect to the input data. Thereupon, bit shift is compensated for, and a signal (FIG. 7F) reproduced from the recording pattern (FIG. 7E) is free from any time deviation with respect to the input data (FIG. 7A).

However, when the temperature of the disk rises, the isothermal line on the magnetic film heated by a laser beam greatly widens as shown in FIG. 8E, even if, as shown in FIG. 8, the laser beam is of the same laser power as what has been described above. Moreover, as compared with the case shown in FIG. 7, the amount of bit shift increases. Accordingly, even if the rising timing of the magnetic field is delayed by an amount td with respect to the input data (FIG. 8A) bit shift cannot be eliminated and thus, a time deviation td' remains between data (FIG. 8A) and the reproduction signal (FIG. G).

FIG. 9 is a schematic view showing a third embodiment of the present invention which takes the influence of the temperature of the medium upon bit shift into account. In FIG. 9, the reference numeral 31 designates a magneto-optical disk which is a recording medium, the reference numeral 34 denotes a semiconductor laser unit, the reference numeral 33 designates a collimator lens for collimating a light beam emitted from the semiconductor laser, the reference numeral 32 denotes an objective lens for condensing the collimated light beam on the disk 31, and the reference numeral 35 designates a laser driver for driving the semiconductor laser unit 34. The reference numeral 36 denotes a thermistor for measuring the temperature of the surroundings of the recording medium, the reference numeral 37 designates a fixed resistor, the reference numeral 38 denotes an analog-digital (A/D) converter for converting the signal from the thermistor 36 into a digital signal, the reference numeral 39 designates a magnetic field producing coil, the reference numeral 40 denotes a driver for the magnetic field producing coil 39, the reference numeral 41 designates a magnetic field modulation pulse generating circuit, and the reference numeral 42 denotes a terminal to which recording data is input.

The operation of the present embodiment will now be described. The magneto-optical disk 31 is rotated at a predetermined number of rotations by a spindle motor, not shown. A certain set electric current flows from the laser driver 35 to the semiconductor laser unit 34, whereby a predetermined quantity of light is emitted therefrom. This emitted light passes through the collimator lens 33 and becomes a parallel light, and is condensed with a certain spot diameter on the disk by the objective lens 32. At this time, the thermistor 36 installed closely adjacent to the medium assumes a resistance value nearly correlated with the temperature of the medium. Accordingly, when the applied voltage to the thermistor is Vcc, a voltage value obtained by dividing Vcc by the resistance value of the thermistor and the fixed resistor 37 is input to the A/D converter 38.

The output of the A/D converter 38 is input to the magnetic field modulation pulse generating circuit 41, where the amount of bit shift is calculated in accordance with the measured temperature and further, a delay time for compensating for this bit shift is calculated. Then, the circuit 41 delays the data input from the terminal 42 by the calculated time and sends it to the coil driver 40. In the coil driver 40, an electric current is caused to flow clockwise or counter-clockwise to the coil 39 in conformity with the data sent from the circuit 41, whereby the direction of the magnetic field is modulated. That is, in the present embodiment, the delay time of the input signal is lengthened or shortened in accordance with the rise or fall of the temperature of the medium. Thus, it is possible to compensate for the bit shift without being affected by a change in the temperature of the medium.

FIG. 10 schematically shows the manner of recording using the apparatus shown in FIG. 9. Here, the delay time tp of the magnetic field (FIG. 10B) with respect to data (FIG. 10A) is that calculated in the aforedescribed magnetic field modulation pulse generating circuit 41 on the basis of the detected temperature of the medium. By the delay time being thus varied in conformity with the temperature of the medium, the reproduction signal (FIG. 10F) is always made free of time deviation relative to the data (FIG. 10A).

In the above-described embodiment, the temperature of the environment near the medium has been detected as being the temperature of the medium. However, the temperature of the medium may be directly measured by bringing a thermistor into contact with the medium.

The variation in the amount of bit shift as described with reference to FIGS. 7 and 8 is caused not only by a change in the temperature of the medium, but also by a change in the relative speed of the medium and the light beam. This is because any change in the speed varies the energy applied to the unit area of the medium per unit time. For example, when the magneto-optical disk is rotated at a predetermined angular speed, the line speed of the light beam relative to the medium becomes lower when the light beam is on the inner peripheral portion of the disk than when the light beam is on the outer peripheral portion of the disk. Thereupon, the isothermal line of the magnetic film widens as in the case of FIG. 8 and the amount of bit shift increases. Accordingly, it is conceivable that if the delay time is set in accordance with the outer peripheral portion of the disk, bit shift cannot be completely eliminated on the inner peripheral portion.

Figure 11:
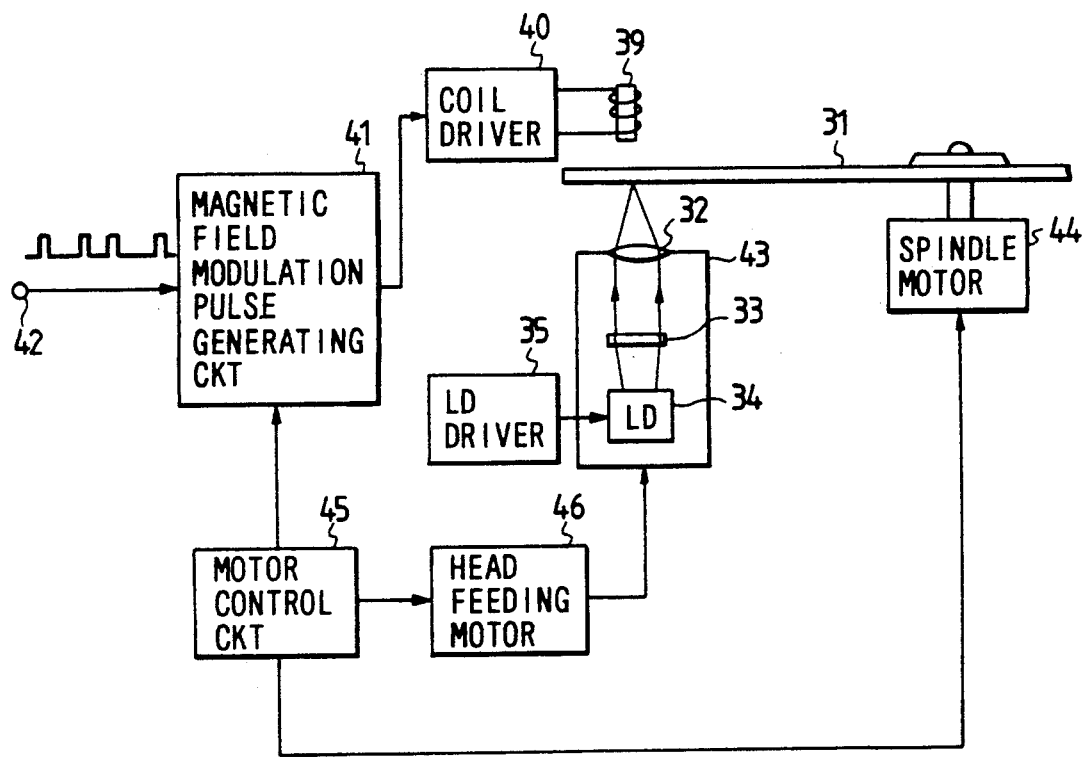
FIG. 11 is a schematic diagram showing a fourth embodiment of the magneto-optical recording apparatus of the present invention.

A fourth embodiment of the present invention which takes the influence of the relative speed of the medium and the light beam as described above into account is shown in the schematic diagram of FIG. 11. In FIG. 11, members identical to those in FIG. 9 are given identical reference numerals and need not be described in detail. In FIG. 11, the reference numeral 44 designates a spindle motor for rotating the magneto-optical disk 31, the reference numeral 43 denotes an optical head carrying the semiconductor laser unit 34, etc. thereon, the reference numeral 46 designates a head feeding motor for moving the optical head 43 radially with respect to the disk, and the reference numeral 45 denotes a motor control circuit for controlling the head feeding motor 46 and the spindle motor 44.

The operation of the present embodiment will now be described.

First, the spindle motor 44 revolves under the control of the motor control circuit 45, whereby the disk 31 is rotated a predetermined number of revolutions.

Subsequently, the address of a desired track on which recording is to be effected is indicated from a host controller, not shown, to the motor control circuit 45. The motor control circuit 45 drives the head feeding motor 46 on the basis of this indication, thereby moving the optical head 43 to the right beneath the desired track. The light emitted from the semiconductor laser unit 34 is condensed by the objective lens 32 and is applied to this track.

On the other hand, the address of the above-mentioned track is input from the motor control circuit 45 to the magnetic field modulation pulse generating circuit 41. The circuit 41 finds from this address the line speed of the disk relative to the light beam, and a delay time for compensating for the amount of bit shift conforming to this line speed is calculated. The circuit 41 delays the data input from the terminal 42 by the calculated time, and sends a magnetic field modulation pulse based on this delayed data to the coil driver 40. The coil driver 40 drives the coil 39 by the pulse sent from the circuit 41, thereby applying a magnetic field modulated in polarity to the disk 31.

By the delay time being thus varied in conformity with the movement line speed of the medium, bit shift can always be reliably prevented even when recording is effected on any track of a so-called constant angular velocity (CAV) type disk.

In the above-described embodiment, the line speed has been calculated from the address of a desired track, but, for example, by mounting an encoder on the optical head, the radial position may be directly detected and the delay time may be calculated by the use of the result of the detection.

The variation in the amount of bit shift as previously described is also caused by the fluctuation of the power of the applied light beam. This will be apparent from the fact that the temperature distribution of the magnetic film is determined in conformity with the power of the light beam. A magneto-optical recording apparatus in which bit shift is prevented with three factors, i.e., the intensity of the light beam, the temperature of the recording medium and the like speed of the recording medium, generally taken into account is shown in FIG. 12.

Figure 12:
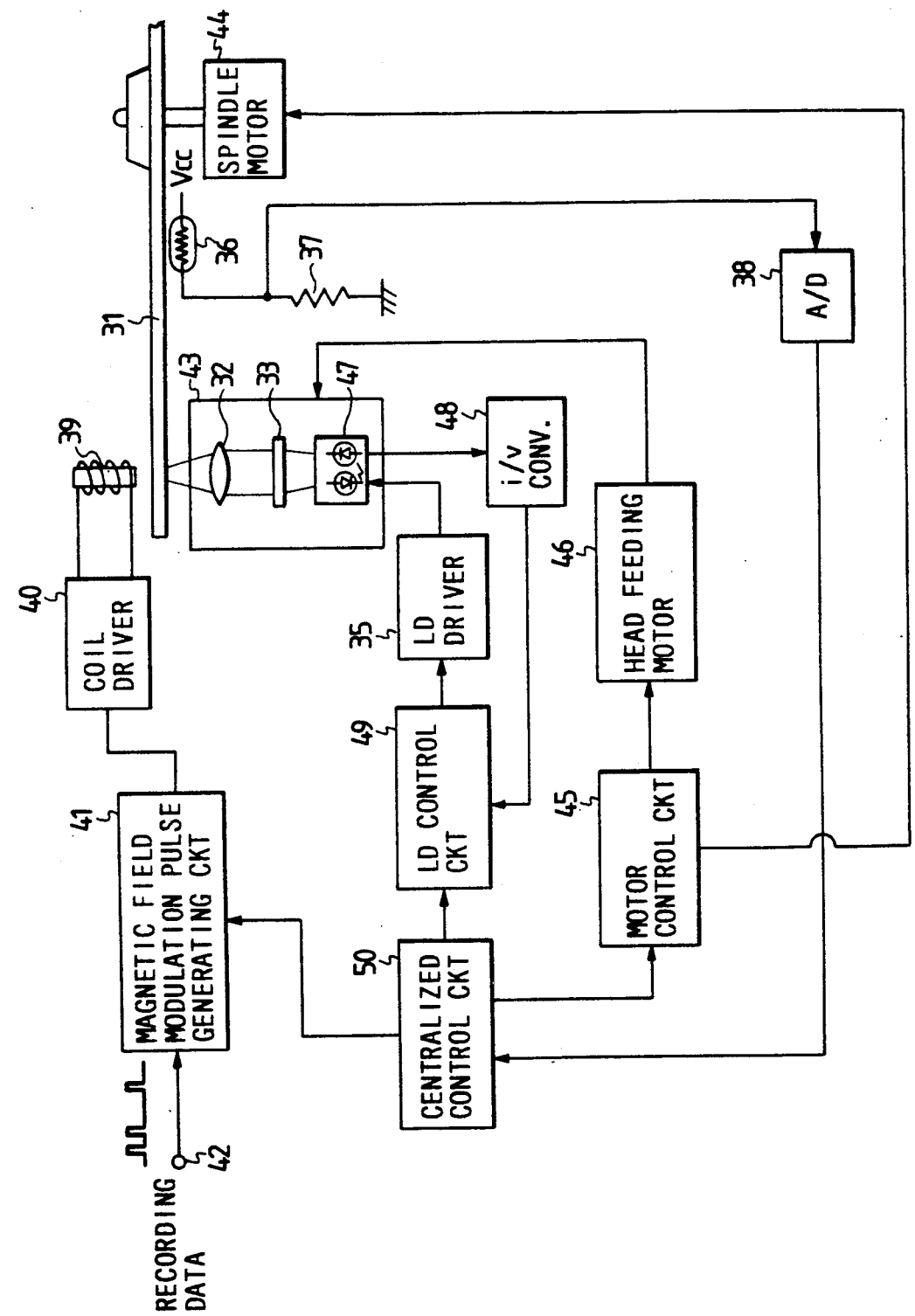
FIG. 12 is a schematic diagram showing a fifth embodiment of the magneto-optical recording apparatus of the present invention.

FIG. 12 is a schematic diagram showing a fifth embodiment of the present invention. In FIG. 12, members identical to those in FIGS. 9 and 11 are given identical reference numerals and need not be described in detail. In FIG. 12, the reference numeral 47 designates a laser unit containing therein a semiconductor laser and a photodiode for receiving part of the emitted light of the laser, the reference numeral 48 denotes a current/voltage (I/V) converter for converting the output current of the photodiode into a voltage, and the reference numeral 49 designates a laser control circuit for controlling the laser driver 35 in accordance with the output of the converter 48. The laser control circuit 49 sets the reference value of the output power of the laser by a command from a centralized control circuit 50. The centralized control circuit 50 sends the address of a desired track to the motor control circuit 45, and moves the optical head 43 to the right beneath a track on which recording is to be effected by the head feeding motor 46. Further, information regarding the temperature of the surroundings of the disk 31 is input to the centralized control circuit 50 through the analog-digital (A/D) converter 38.

The operation of the present embodiment will now be described.

The magneto-optical disk 31 is rotated a predetermined number of revolutions by the spindle motor 44. The optical head 43 is moved to the right beneath a desired track in the same manner as in the fourth embodiment, on the basis of the address indicated from the centralized control circuit 50.

A light of power PomW is emitted from the semiconductor laser in the laser unit 47, is collimated through the collimator lens 33, and is condensed on the disk by the objective lens 32. At this time, part of the laser light is received by the photodiode contained in the laser unit 47 and a photocurrent flows. The photocurrent is converted into a voltage by the current/voltage converter 48 and is input to the laser control circuit 49. This laser control circuit 49 controls the supplied current to the laser in accordance with the input thereto, thereby performing an APC (auto power control) operation. The reference power of the APC is changed over by instructions from the centralized control circuit 50.

The centralized control circuit 50 judges the line speed of the disk from the address of the track indicated to the motor control circuit 45, and judges the power of the light beam from the instructions to the laser control circuit 49. The centralized control circuit 50 then calculates the amount of bit shift on the basis of the line speed, the laser power and the information of the temperature of the disk input from the A/D converter 38, and calculates a delay time for compensating for this bit shift. The circuit 50 then sends this delay time to the magnetic field modulation pulse generating circuit 41. The circuit 41 delays the data input from the terminal 42 by the calculated time and sends it to the coil driver 40. In the coil driver 40, the current is caused to flow clockwise or counterclockwise to the coil 39 in conformity with the data sent from the circuit 41 to thereby modulate the direction of the magnetic field. That is, in the present embodiment, the delay time is varied in conformity with the from-time-to-time situations (the laser power, the line speed and the temperature of the recording medium), whereby bit shift is reliably eliminated.

While in the present embodiment, the power of the light beam has been judged from the instructions of the centralized control circuit 50, the power of the light beam may be directly measured, for example, by detecting the reflected light of the light beam from the disk.

In the above-described embodiments, the delay time has been calculated with the temperature of the medium, etc. as parameters, the actual amount of bit shift may be detected by effecting trial writing before recording and the input signal may be delayed by a time conforming to the detected amount of shift. Such an example will hereinafter be described.

Figure 13:
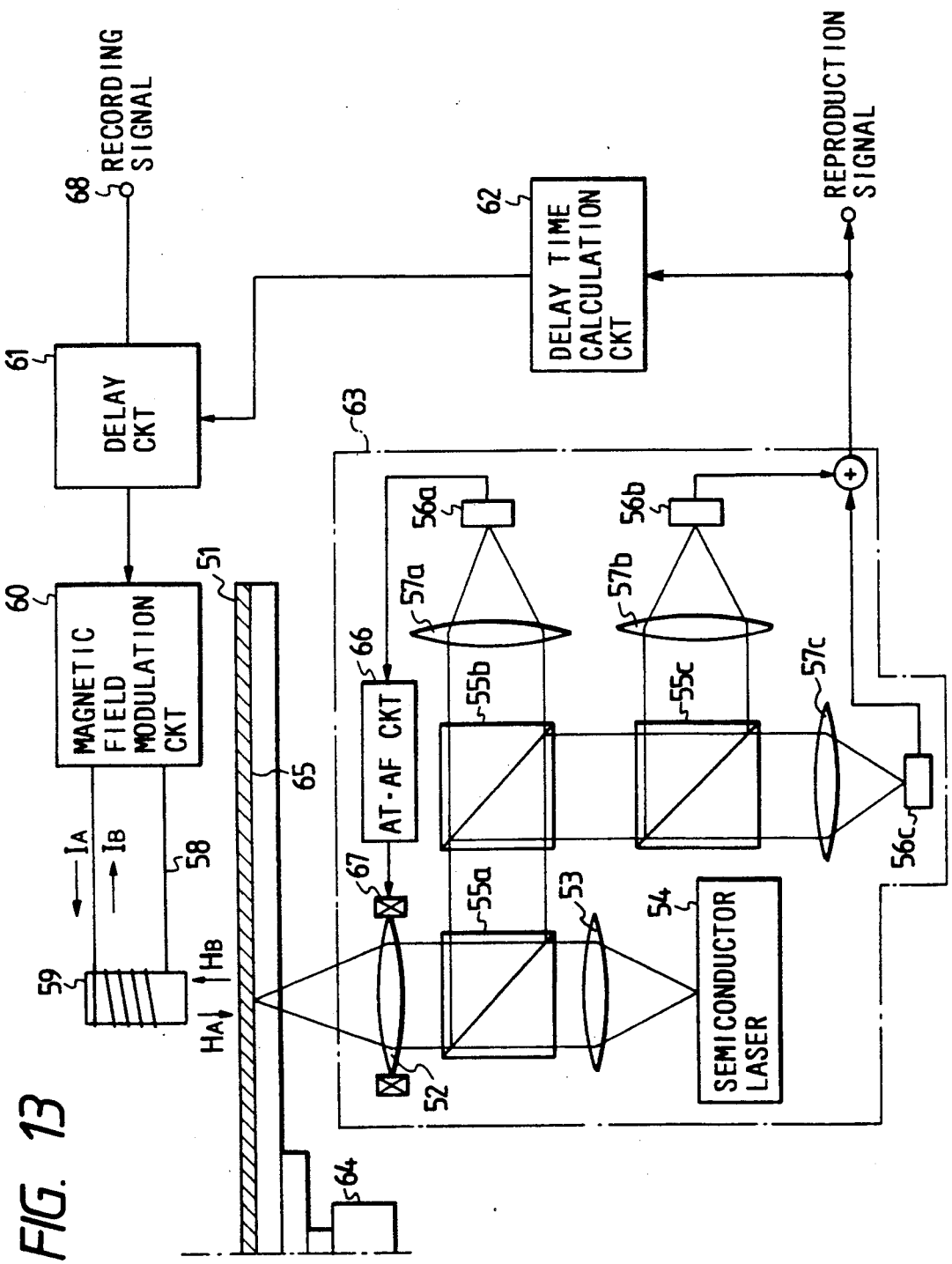
FIG. 13 is a schematic diagram showing a sixth embodiment of the magneto-optical recording apparatus of the present invention.

FIG. 13 is a schematic diagram showing a sixth embodiment of the present invention.

In FIG. 13, the reference numeral 51 designates a magneto-optical disk, and the reference numeral 65 denotes a magnetic film. The magneto-optical disk 51 is rotatively driven by a motor 64.

Recording or reproduction of information is effected on the magneto-optical disk 51 by an optical pick-up 63. The optical pick-up 63 contains therein a semiconductor laser 54 as a light source. A light emitted from the semiconductor laser 54 is transmitted through a collimator lens 53 and a beam splitter 55a, and is condensed on the magneto-optical disk 51 by an objective lens 52. On the other hand, the light reflected by the magneto-optical disk 51 again passes through the objective lens 52, is separated from the incident light by the beam splitter 55a, and the light is further divided into two lights by a beam splitter 55b, and one of the two lights is received by a photosensor 56a through a sensor lens 57a. On the basis of the output of this photosensor 56a, a focus error signal and a track error signal are detected by an auto-tracking and auto-focusing (AT and AF) circuit 66. These error signals are input to an actuator 67 to drive the objective lens 52, whereby auto-tracking and auto-focusing are effected.

The other light is further divided into two lights by a beam splitter 55c, and the respective lights are received by photosensors 56b and 56c through sensor lenses 57b and 57c. The sum of signals from the photosensors 56b and 56c is taken, whereby a reproduction signal is obtained.

The optical pick-up 63 is designed such that the laser light of predetermined intensity continuously emitted from the semiconductor laser 54 is locally applied to the magnetic film 65 of the magneto-optical disk 51 to thereby cause the temperature of the magnetic film 65 in the irradiated portion to rise to the curie point or higher.

The reference numeral 59 designates an electromagnet for applying a magnetic field to the magnetic film of the magneto-optical disk 51. In the present embodiment, this electromagnet 59 is operatively associated with the optical pick-up 63 with the magneto-optical disk 51 interposed therebetween so that the electromagnet may be movable radially with respect to the magneto-optical disk.

The reference numeral 60 denotes a magnetic field modulation circuit. The direction of an electric current flowing to a coil 58 wound on the electromagnet 59 is inverted in conformity with a recording signal input to the magnetic field modulation circuit 60. For example, when the signal level of the recording signal is a high level "1", an electric current flowing in a direction indicated by arrow $I_A$ is supplied to the coil 58, and when the signal level is a low level "0", an electric current flowing in a direction indicated by arrow $I_B$ is supplied to the coil 58. In the electromagnet 59, a magnetic field as indicated by arrow $H_A$ is produced when the signal level of the recording signal is the high level "1", and a magnetic field as indicated by arrow $H_B$ is produced when the signal level of the recording signal is the low level "0".

The magnetic fields indicated by arrows $H_A$ and $H_B$ differ in direction, but are equal in intensity. Also, when the intensity of the magnetic field indicated by arrow $H_A$ and the intensity of the magnetic field indicated by arrow $H_B$ are He and $-$He, respectively, $|\pm He|$ is the intensity for orienting the direction of the magnetic region of the magnetic film to which the light beam is applied.

A delay time calculation circuit 62 detects bit shift from the reproduction signal of a bit written on trial, and calculates a delay time for correcting the detected amount of shift. The calculated delay time is indicated to a delay circuit 61. The delay circuit 61 delays a signal input from a terminal 68 by the time indicated from the circuit 62 and sends it to the magnetic field modulation circuit 60.

The operation of the above-described apparatus is performed by the following procedure. The optical pick-up 63 is first moved by a motor, not shown, to a location at which a light beam is to be applied to a desired track on the disk 51. A light beam is then applied to this track. At the same time, a particular test signal is input from the terminal 68, and a magnetic field modulated in conformity with this test signal is applied from the electromagnet 59 to the disk 51. Thereby, the test signal is recorded on the disk 51.

Subsequently, the power of the light beam is lowered to the reproduction level, and the track on which the test signal has been recorded is scanned by the light beam. The reflected light of this light beam reflected by the disk is received by the photosensors 56b and 56c, and the test signal is reproduced. The reproduced signal is sent to the delay time calculation circuit 62. In the circuit 62, for example, the time from the synchronizing signal shown in FIG. 2A until the rising of the reproduction signal (FIG. 2F) is compared with the time from the synchronizing signal (FIG. 2A) until the recording signal (FIG. 2B,) whereby the difference between these times is detected. The circuit 62 indicates the detected time difference as a delay time to the delay circuit 61.

Subsequently, the power of the light beam is again heightened to the recording level. A signal to be recorded is then input from the terminal 68. The recording signal thus input is delayed by the delay circuit 61 by the time indicated from the circuit 62, and is sent to the magnetic field modulation circuit 60. The circuit 60 flows an electric current conforming to this recording signal to the coil 58, and applies a modulated magnetic field from the electromagnet 59 to the disk 51. On the track on the disk 51, the recording signal is overwritten on the test signal by the modulated magnetic field.

By the process described above, the recording signal is recorded on the magneto-optical disk without causing bit shift. The above-described operation is all controlled by a central processing unit (CPU), not shown.

The trial writing in the present embodiment need not always be effected each time the recording signal is input. For example, the temperature of the recording medium may be detected at all times, and when the amount of variation in the temperature exceeds a predetermined value, the trial writing may be effected. There is also conceivable a method of simply effecting the trial writing at each predetermined time or a method of effecting the trial writing each time a predetermined number of tracks are recorded.

The present invention permits various applications, besides the embodiments described above. For example, the medium need not always be heated to the curie point by the light beam, but may be heated to a temperature at which there is provided such a coercive force that the direction of magnetization is inverted depending on the magnetic field applied. The present invention is also applicable to the so-called compensation temperature writing method in which the medium is heated to its compensation temperature. In the present invention, the medium is not limited to the disk-like shape, but may be of any shape such as a card-like shape or a tape-like shape. The present invention covers all of the above-described applications without departing from the scope thereof defined in the appended claims.

What is claimed is:

1. An apparatus for recording an input signal on a magneto-optical recording medium, comprising:
   means for applying a light beam to said medium;
   means for delaying said input signal by a time for preventing a bit recorded on said medium from shifting relative to said input signal;
   means for applying a magnetic field modulated in conformity with said delayed signal to that portion of said medium to which the light beam is applied; and
   means for moving said medium relative to the light beam.

2. An apparatus according to claim 1, wherein said magnetic field applying means alternately applies to said medium pulse-like magnetic fields having opposite polarities.

3. An apparatus according to claim 2, further comprising means for making the magnetic field intensity during a period corresponding to the rear end portion of said pulse-like magnetic fields smaller than the magnetic field intensity during the other period.

4. An apparatus for recording an input signal on a magneto-optical recording medium, comprising:
   means for applying a light beam to said medium;
   means for detecting the temperature of said medium;
   means for delaying said input signal by a time determined in conformity with the temperature detected by said temperature detecting means;
   means for applying a magnetic field modulated in conformity with said delayed signal to that portion of said medium to which the light beam is applied; and
   means for moving said medium relative to the light beam.

5. An apparatus according to claim 4, wherein said temperature detecting means detects the temperature of the atmosphere near said medium.

6. An apparatus for recording an input signal on a magneto-optical recording medium, comprising:
   means for applying a light beam to said medium;
   means for moving said medium relative to the light beam;
   means for judging the relative line speed of said medium and the light beam;
   means for delaying said input signal by a time determined in conformity with the line speed judged by said speed judging means; and
   means for applying a magnetic field modulated in conformity with said delayed signal to that portion of said medium to which the light beam is applied.

7. An apparatus according to claim 6, wherein said medium, is a magneto-optical disk, said moving means rotates said disk at a predetermined angular speed, and said speed judging means judges the line speed by the disk radial position of that portion to which the light beam is applied.

8. An apparatus for recording an input signal on a magneto-optical recording medium, comprising:
   means for applying a light beam to said medium;
   means for judging the power of the light beam applied to said medium;
   means for delaying said input signal by a time determined in conformity with the power judged by said power judging means;
   means for applying a magnetic field modulated in conformity with said delayed signal to that portion of said medium to which the light beam is applied; and
   means for moving said medium relative to the light beam.

9. An apparatus according to claim 8, further comprising means for judging the relative line speed of said medium and the light beam and wherein said delay means varies the delay time in conformity with the line speed judged by said speed judging means.

10. An apparatus according to claim 9, wherein said medium is a magneto-optical disk, said moving means rotates said disk at a predetermined angular speed, and said speed judging means judges the line speed by the disk radial position of that portion to which the light beam is applied.

11. An apparatus according to claim 9, further comprising means for detecting the temperature of said medium and wherein said delay means varies the delay time in conformity with the temperature detected by said temperature detecting means.

12. An apparatus according to claim 11, wherein said temperature detecting means detects the temperature of the atmosphere near said medium.

13. An apparatus for recording a signal on a magneto-optical recording medium, comprising:
   means for applying a light beam to said medium;
   means for applying a magnetic field modulated in conformity with said signal to that portion of said medium to which the light beam is applied;
   means for moving said medium relative to the light beam;
   means for recording a test signal on said medium by said magnetic field applying means;
   means for reproducing the test signal recorded on said medium;
   means for detecting bit shift from said reproduced signal; and
   means for delaying a data signal input to said magnetic field applying means by a time necessary to compensate for the detected bit shift.

14. A method of recording a signal on a magneto-optical recording medium, comprising the steps of:
   scanning said medium by a light beam and at the same time, applying to said medium a magnetic field modulated in conformity with a test signal, thereby recording the test signal on said medium;
   reproducing the test signal recorded on said medium;
   detecting bit shift from the reproducing signal;
   delaying a data signal by a time necessary to compensate for the detected bit shift; and
   scanning said medium by the light beam and at the same time, applying to said medium a magnetic field modulated in conformity with said delayed signal, thereby recording said data signal on said medium.

15. An apparatus for recording an input signal on a magneto-optical recording medium, comprising:
   an optical head for applying a light beam to said medium;
   a delay circuit for delaying said input signal by a time for preventing a bit recorded on said medium from shifting relative to the input signal;
   a magnetic head for applying a magnetic field modulated in conformity with said delayed signal to that portion of said medium to which the light beam is applied; and
   a motor for moving said medium relative to the light beam.

16. An apparatus according to claim 15, wherein said magnetic head alternately applies pulse-like magnetic fields having opposite polarities.

17. An apparatus according to claim 16, further comprising a magnetic field waveform adjusting circuit for making the magnetic field intensity during a period corresponding to the rear end portion of said pulse-like magnetic fields smaller than the magnetic field intensity during the other period.

18. An apparatus for recording an input signal on a magneto-optical recording medium, comprising:
- an optical head for applying a light beam to said medium;
- a detector for detecting the temperature of said medium; a delay circuit for delaying said input signal by a time determined in conformity with the temperature detected by said temperature detector;
- a magnetic head for applying a magnetic field modulated in conformity with said delayed signal to that portion of said medium to which the light beam is applied; and
- a motor for moving said medium relative to the light beam.

19. An apparatus according to claim 18, wherein said temperature detector detects the temperature of the atmosphere near said medium.

20. An apparatus according to claim 19, wherein said temperature detector comprises a thermistor disposed proximate to said medium.

21. An apparatus for recording an input signal on a magneto-optical disk on which a plurality of tracks are formed concentrically or spirally, comprising:
- a spindle motor for rotating said disk at a predetermined angular speed;
- an optical head for applying a light beam to said disk;
- a head feeding motor for moving said optical head radially of said disk;
- a control circuit for outputting a command to said head feeding motor so as to move said optical head to a position at which the light beam is applied to a desired track on said disk;
- a delay circuit for delaying said input signal by a time determined by the disk radial position of the desired track commanded by said control circuit; and
- a magnetic head for applying a magnetic field modulated in conformity with said delayed signal to at least the desired track of said disk.

22. An apparatus for recording an input signal on a magneto-optical recording medium, comprising:
- an optical head for applying a light beam to said medium;
- a control circuit for commanding said optical head regarding the power of the light beam applied to said medium;
- a delay circuit for delaying said input signal by a time determined in conformity with the power commanded by said control circuit;
- a magnetic head for applying a magnetic field modulated in conformity with said delayed signal to that portion of said medium to which the light beam is applied; and
- a motor for moving said medium relative to the light beam.

23. An apparatus according to claim 22, wherein said control circuit comprises a photodetector for receiving part of the light beam emitted from said optical head, a comparing circuit for comparing the output of said photodetector with a target value, a feedback circuit for feeding back the output of said comparing circuit to said optical head, and a setting circuit for changing over the target value of said comparing circuit.

24. An apparatus according to claim 22, further comprising a judging circuit for judging the relative line speed of said medium and the light beam and wherein said delay circuit varies the delay time in conformity with the line speed judged by said speed judging circuit.

25. An apparatus according to claim 24, wherein said medium is a magneto-optical disk, said motor rotates said disk at a predetermined angular speed, and said speed judging circuit judges the line speed by the disk radial position of that portion to which the light beam is applied.

26. An apparatus according to claim 24, further comprising a detector for detecting the temperature of said medium and wherein said delay circuit varies the delay time in conformity with the temperature detected by said temperature detector.

27. An apparatus according to claim 26, wherein said temperature detector detects the temperature of the atmosphere near said medium.

28. An apparatus for recording a signal on a magneto-optical recording medium, comprising:
- an optical head for applying a light beam to said medium;
- a magnetic head for applying a magnetic field modulated in conformity with the signal to that portion of said medium to which the light beam is applied;
- a motor for moving said medium relative to the light beam;
- a controller for recording a test signal on said medium by said magnetic head;
- a reproducing circuit for reproducing the test signal recorded on said medium;
- a detecting circuit for detecting bit shift from said reproduced signal; and
- a delay circuit for delaying a data signal input to said magnetic head by a time necessary to compensate for the detected bit shift.

29. A method of recording an input signal on a magneto-optical recording medium, said method comprising the steps of:
- applying a light beam to the medium;
- moving the medium relative to the light beam;
- delaying the input signal by a time for preventing a bit to be recorded on the medium from shifting relative to the input signal; and
- applying a magnetic field modulated in conformity with the delayed signal to that portion of the medium to which the light beam is applied.

30. A method according to claim 29, wherein the step of applying a modulated magnetic field to the medium comprises applying pulse-like magnetic fields having polarities reversed according to the delayed signal.

31. A method according to claim 30, wherein the magnetic field intensity during a period corresponding to a rear end portion of the pulse-like magnetic fields is less than the magnetic field intensity during another period.

32. A method of recording an input signal on a magneto-optical recording medium, said method comprising the steps of:
- applying a light beam to the medium;
- moving the medium relative to the light beam;
- detecting temperature of the medium;
- delaying the input signal by a time determined in conformity with the detected temperature; and applying a magnetic field modulated in conformity with the delayed signal to that portion of the medium to which the light beam is applied.

33. A method according to claim 32, wherein the step of detecting temperature of the medium comprises detecting the temperature of the atmosphere near the medium.

34. A method of recording an input signal on a magneto-optical recording medium, said method comprising the steps of:
  applying a light beam to the medium;
  moving the medium relative to the light beam;
  judging the relative line speed of the medium and the light beam;
  delaying the input signal by a time determined by conformity with the judged line speed; and
  applying a magnetic field modulated in conformity with the delayed signal to that portion of the medium to which the light beam is applied.

35. A method according to claim 34, wherein the medium comprises a magneto-optical disk, and the step of judging the relative line speed comprises detecting position in the disk radial direction of that portion to which the light beam is applied, while rotating the disk with a constant angular speed.

36. A method of recording an input signal on a magnetooptical recording medium, said method comprising the steps of:
  applying a light beam to the medium;
  moving the medium relative to the light beam;
  judging the power of the light beam applied to the medium;
  delaying the input signal by a time determined in conformity with the judged power of the light beam; and
  applying a magnetic field modulated in conformity with the delayed signal to that portion of the medium to which the light beam is applied.

37. A method according to claim 36, further comprising a step of judging the relative line speed of the medium and the light beam, and wherein timing of the delayed signal varies in conformity with the judged relative line speed.

38. A method according to claim 37, wherein the medium comprises a magneto-optical disk, and the step of judging the relative line speed comprises detecting position in the disk radial direction of that portion to which the light beam is applied, while rotating the disk with a constant angular speed.

39. A method according to claim 37, further comprising a step of detecting temperature of the medium, and wherein the delay timing varies in conformity with the detected temperature.

40. A method according to claim 39, wherein the step of detecting temperature of the medium comprises detecting temperature of the atmosphere near the medium.

* * * * *

UNITED STATES PATENT AND TRADEMARK OFFICE
CERTIFICATE OF CORRECTION

PATENT NO. : 5,091,897

DATED : February 25, 1992

INVENTOR(S) : Mitsuhiro Otokawa, et al.

Page 1 of 3

It is certified that error appears in the above-identified patent and that said Letters Patent is hereby corrected as shown below:

COLUMN 1

Line 50, "of" should read --with respect to--; and
Line 59, "($b_1$) of" should be deleted.

COLUMN 2

Line 7, "curie" should read --Curie--;
Line 52, "of" (first occurrence) should read --for--; and
Line 63, "Fig." should read --Figs.--.

COLUMN 3

Line 7, "Fig." should read --Figs.--;
Line 12, "charges." should read --changes.--; and
Line 45, "of" should read --with respect to--.

COLUMN 4

Line 5, "from," should read --from--;
Line 9, "curie" should read --Curie--;
Line 43, "detected," should read --detected--; and
Line 65, "film 3." should read --film 13.--.

UNITED STATES PATENT AND TRADEMARK OFFICE
CERTIFICATE OF CORRECTION

PATENT NO. : 5,091,897

DATED : February 25, 1992

INVENTOR(S) : Mitsuhiro Otokawa, et al.

It is certified that error appears in the above-identified patent and that said Letters Patent is hereby corrected as shown below:

COLUMN 5

Line 26, "(Fig. 8A)" should read --(Fig. 8A),--; and
Line 30, "(Fig. G)." should read --(Fig. 8G).

COLUMN 8

Line 53, "the" (second occurrence) should read --while the--.

COLUMN 9

Line 29, "curie" should read --Curie--.

COLUMN 10

Line 23, "the," should read --the--;
Line 24, "(Fig. 2B,)" should read --(Fig. 2B),--; and
Line 55, "curie" should read --Curie--.

COLUMN 11

Line 54, "medium," should read --medium--.

UNITED STATES PATENT AND TRADEMARK OFFICE
CERTIFICATE OF CORRECTION

PATENT NO. : 5,091,897

DATED : February 25, 1992

INVENTOR(S) : Mitsuhiro Otokawa, et al.

It is certified that error appears in the above-identified patent and that said Letters Patent is hereby corrected as shown below:

COLUMN 13

Line 15, the clause beginning with "a delay" should begin a new paragraph.

COLUMN 15

Line 16, "by" should read --in--.

Signed and Sealed this

Eleventh Day of August, 1992

Attest:

DOUGLAS B. COMER

Attesting Officer

Acting Commissioner of Patents and Trademarks